United States Patent Office 3,484,274
Patented Dec. 16, 1969

3,484,274
HEAT SEALABLE POLYURETHANE COMPOSITE AND METHOD OF MAKING SAME
Edward W. McCarthy, Poughkeepsie, N.Y., assignor to Chemical Rubber Products, Inc., Beacon, N.Y., a corporation of Delaware
No Drawing. Filed Jan. 23, 1967, Ser. No. 610,791
Int. Cl. C09j 5/06; B44d 1/22; C08d 13/24
U.S. Cl. 117—76          10 Claims

ABSTRACT OF THE DISCLOSURE

This invention relates to a method of improving the adhesion of a heat sealable, polyamide based, thermoplastic polyurethane composite to itself. The method produces a composite which exhibits adhesive values in the order of 28 lbs./in. compared to the more common commercial values of about 5–8 lbs./in. and lower. In the method, a polyamide sheeting material is treated with a solution of an isocyanate having a plurality of isocyanato groups, subjected to a high temperature cure, then treated with an isocyanate containing polyurethane solution and the solvent evaporated at a lower elevated temperature, and finally treated with a second polyurethan solution with no appreciable isocyanate and the solvent evaporated to produce the composite.

---

This invention relates to a method of preparing heat sealable, thermoplastic polyurethane composites and more particularly to the preparation of heat sealable, polyamide based, polyurethane composites which exhibit unusually high adhesive values after being heat sealed.

The term "polyurethanes" refers to polymers described in such references as Polyurethanes, Chemistry and Technology, by Saunders and Frisch, copyrighted 1964, and Modern Plastics Encyclopedia, 1966. In general, these urethane polymers are derived from hydroxy containing reactants and isocyanates. They are useful in many areas of application with the particular conditions of their use dependent in many instances on the particular application.

One application of these polymers has been as heat sealable coatings on polyamide sheeting materials, notably those based on linear polyamides which are in the form of fabrics. In this use, the polyurethanes are thermoplastic in nature in order to serve as the heat sealable medium.

These composites are commercially available and have been found useful in the fabrication of various articles by heat sealing adjoining edges of the composites together. In general, the adhesion of the physical bond has been commonly in the order of about 5–8 lbs./in. as tested in a 180 degree peel test. While the strength of this bond may be satisfactory for many purposes, in some instances increased adhesion is necessary.

Therefore, one object of the invention is the increase in the adhesion of polyamide based, polyurethane composites after heat sealing. Another object is the retention of flexibility in the composite and retention of thermoplasticity in the polyurethane coating. Other objects will become apparent from the detailed description below.

I have found that adhesion can be increased from about 5–8 lbs./in. to values in the order of about 28 lbs./in. by the use of a particular method of preparation of these composites. By way of summary of the method, the polyamide sheeting material is treated with an isocyanate solution, subjected to a high temperature cure above about 200° F., then treated with an isocyanate containing, polyurethane solution with the solvent being removed by evaporation at an elevated temperature, and finally treated with a polyurethane solution without any appreciable isocyanate. Evaporation of the solvent is carried out to produce the composite. In this technique, the useful thermoplastic characteristics of the polyurethane are retained while at the same time the adhesive properties of the heat sealed composite are significantly improved.

In the method, the linear polyamide sheeting material is descriptive of linear polyamides having available hydrogen in the amide group. In addition, these polyamides are thermoplastic in nature and are advantageously aliphatic. Suitable polyamides with these characteristics are further identified in such references as Polyamide Resins by Floyd, copyrighted 1958. A particularly advantageous type of polyamide is that prepared from aliphatic reactants wherein at least one of the reactants has about 6 carbon atoms. Nylon 6,6 and 10,6 are illustrative of this type.

The linear polyamide sheeting material is treated with a solution of an isocyanate having a plurality of isocyanato groups. Advantageously, the solvent is an inert, volatile solvent such as toluene which is easily removed during the subsequent high temperature cure. Suitable isocyanates include those with a plurality of isocyanato groups as described on pages 177–180 of Modern Plastics Encyclopedia, 1966. Preferably, the isocyanate has from 2 to approximately 3 isocyanato groups per molecule on the average. Advantageously, the isocyanates are polymeric such as polymethylene polyphenyl isocyanate having more than 2 and usually approximately 3 isocyanato groups per molecule on the average. Although the optimum amounts of isocyanate to polyamide depend on the particular materials, usually about 1–10 weight percent of the isocyanate based on the weight of polyamide is sufficient to provide the desired results.

The treated sheeting material is then subjected to a high temperature cure at a temperature above about 200° F., advantageously about 200–350° F. and preferably about 250–350° F. With polyamides such as nylon 6,6 and an isocyanate such as polymethylene polyphenyl isocyanate, a temperature of about 270–330° F. and advantageously about 300° F. provides very useful results. Based on a cure temperature of 300° F., curing times are in the order of 5 minutes.

The cured product is then treated with a polyurethane solution containing at least about 5 weight percent based on the polyurethane of a second isocyanate, Advantageously, the amount of the second isocyanate is about 5–20 weight percent and preferably about 5–15 weight percent. With a polyurethane such as one based on a linear polyester resin and a diisocyanate and an isocyanate such as polymethylene polyphenyl isocyanate, amounts of about 5–15 weight percent and preferably about 10 weight percent provide very useful results.

The second isocyanate is also one having a plurality of isocyanato groups and can be described by the language above relating to the first. Advantageously, the second isocyanate is polymethylene polyphenyl isocyanate.

Usually, the amount of polyurethane present in the solution is controlled to provide useful viscosities coupled with relatively high solids content of the solution. Normally, not more than about 40 weight percent and advantageously about 20–40 weight percent of the polyurethane is present.

These polyurethanes, as defined above, are usually soluble in such solvents as dimethyl formamide, dimethyl acetamide, and tetrahydrofuran. Mixtures of these solvents with other solvents such as methyl ethyl ketone also are useful.

The polyurethane treated material is then treated to an elevated temperature of about 100–200° F. to produce a solid polyurethane coating on the material. Advantageously, the temperature is about 140–200° F. More particularly, with a solvent mixture of dimethyl formamide and methyl ethyl ketone, temperatures of about 140–160° F. provide very useful results. The time of such treatment is sufficient to provide a solid coating of polyurethane.

Next, the polyurethane coated material is treated with a second polyurethane solution containing no appreciable isocyanate to provide a second coating of polyurethane. The final composite is formed by evaporating the solvent at the temperatures described above for the first polyurethane solution.

The following example illustrates some of the embodiments of this invention. It is to be understood that these are for illustrative purposes only and do not purport to be wholly definitive to conditions or scope.

EXAMPLE

A heat sealable fabric was prepared from a 6,6 saturated aliphatic polyamide. In the preparation, a 3 oz./yd.² polyamide fabric was dipped in a 3 weight percent solution of polymethylene polyphenyl isocyanate in toluene. This isocyanate is characterized on the average as a tri-isocyanate with a molecular weight of approximately 388. The treated fabric was then heat treated at approximately 300° F. for about 5 minutes to promote curing. This was followed by a second dip in a solution containing a thermoplastic, elastomeric polyester-urethane (about 2 lbs./gal.) and polymethylene polyphenyl isocyanate (about 10 weight percent based on the isocyanate). The solvent was a 50/50 mixture by volume of MEK/DMF. After this treatment, the fabric was passed through a drying oven at approximately 140–160° F. during which the polyester-urethane formed a solid coating on the fabric. Subsequently, a second coating of the polyester-urethane without the isocyanate was applied to each side of the coated fabric. After each dip, the fabric was again treated at approximately 140–160° F. to form the solid coating. The final coatings were approximately 3 oz./yd.² on one side and approximately 1 oz./yd.² on the other side of the fabric.

For comparison purposes, a coated fabric was prepared using the materials and techniques described above except that the initial treatment with the isocyanate solution was not subjected to the heat treatment at 300° F. This coated fabric was tested as above and resulted in an adhesion value of 8 lbs./in.

While the invention has been described in conjunction with a specific example thereof, this is illustrative only. Accordingly, many alterntaives, modifications, and variations will be apparent to those skilled in the art in the light of the foregoing description.

I claim:
1. A method of preparing a heat sealable polyamide based, thermoplastic polyurethane composite which exhibits improved adhesion when heat sealed to itself, which method comprises (1) treating a linear polyamide sheeting material with a solution of a first isocyanate having a plurality of isocyanate groups, (2) subjecting the treated material to a high temperature cure above about 200° F., (3) treating the cured material with a polyurethane solution containing at least about 5 weight percent based on the polyurethane of a second isocyanate having a plurality of isocyanate groups, (4) removing the solvent at an elevated temperature of about 100–200° F. to produce a polyurethane coated material, (5) treating the coated material with a second polyurethane solution containing no appreciable isocyanate and (6) removing the solvent to produce the composite.

2. The method of claim 1 wherein the treatment of the polyamide sheeting material is carried out with about 1–10 weight percent of the isocyanate in an inert, volatile solvent, and the curing of the treated polyamide is carried out at a temperature of about 270–330° F.

3. The method of claim 2 wherein at least the first isocyanate is polyphenyl polymethylene polyisocyanate.

4. The method of claim 1 wherein the treatment of the cured polyamide material is carried out with a polyurethane solution containing about not more than about 40 weight percent polyurethane in an inert, volatile solvent, and about 5–20 weight percent based on the polyurethane of the second isocyanate.

5. The method of claim 4 wherein at least the second isocyanate is polyphenyl polymethylene polyisocyanate.

6. The method of claim 1 wherein the treatment of the polyamide material with isocyanate is carried out with about 1–10 weight percent of the isocyanate in an inert, volatile solvent, the curing of the treated polyamide is at a temperature of about 270–330° F., the treatment of the cured polyamide material is carried out with a polyurethane solution containing not more than about 40 weight percent of polyurethane in an inert, volatile solvent, and about 5–20 weight percent based on the polyurethane of the second isocyanate.

7. The method of claim 6 wherein the solvent of the isocyanate containing polyurethane solution is removed at a temperature of about 140–200° F.

8. The method of claim 7 wherein both isocyanates are polyphenyl polymethylene polyisocyanate and the solvent removal is at a temperature of about 140–160° F.

9. A heat sealable, composite produced by the method of claim 8 and having adhesive values when heat sealed to itself of in excess of 8 lbs./in. as measured in a 180 degree peel test.

10. A heat sealable, composite produced by the method of claim 1 and having adhesive values when heat sealed to itself of in excess of 8 lbs./in. as measured in a 180 degree peel test.

References Cited

UNITED STATES PATENTS 2,721,811  10/1955  Dacey et al.
3,245,827  4/1966   Weber.
3,326,810  6/1967   Dolan et al.

WILLIAM D. MARTIN, Primary Examiner

RALPH HUSACK, Assistant Examiner

U.S. Cl. X.R.

117—122, 138.8